US012752806B2

(12) United States Patent
Tsuchiya et al.

(10) Patent No.: US 12,752,806 B2
(45) Date of Patent: Oct. 6, 2026

(54) ELECTRONIC CONTROL DEVICE AND VEHICLE CONTROL SYSTEM

(71) Applicant: Hitachi Astemo, Ltd., Hitachinaka (JP)

(72) Inventors: Ryo Tsuchiya, Hitachinaka (JP); Takeshi Seta, Hitachinaka (JP); Kazuyoshi Serizawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 98 days.

(21) Appl. No.: 18/698,503

(22) PCT Filed: Nov. 9, 2021

(86) PCT No.: PCT/JP2021/041130
§ 371 (c)(1),
(2) Date: Apr. 4, 2024

(87) PCT Pub. No.: WO2023/084581
PCT Pub. Date: May 19, 2023

(65) Prior Publication Data
US 2024/0416936 A1 Dec. 19, 2024

(51) Int. Cl.
*B60W 50/06* (2006.01)

(52) U.S. Cl.
CPC .................................. *B60W 50/06* (2013.01)

(58) Field of Classification Search
CPC .................................................... B60W 50/06
See application file for complete search history.

(56) References Cited

U.S. PATENT DOCUMENTS

| | | | | |
|---|---|---|---|---|
| 10,735,988 B2 | | 8/2020 | Nagamura | |
| 10,917,808 B2 | | 2/2021 | Nagamura | |
| 2010/0063663 A1 | * | 3/2010 | Tolstedt | G05D 1/0231 701/41 |
| 2019/0377341 A1 | * | 12/2019 | Choi | B60W 50/082 |

(Continued)

FOREIGN PATENT DOCUMENTS

| | | |
|---|---|---|
| JP | 2021-011231 A | 2/2021 |
| JP | 2021-081886 A | 5/2021 |
| WO | WO-2018/151179 A1 | 8/2018 |

OTHER PUBLICATIONS

International Search Report and Written Opinion, with English Translations, of International Patent Application No. PCT/JP2021/041130, mailed Dec. 12, 2021, 9 pages.

(Continued)

*Primary Examiner* — Naeem Taslim Alam
(74) *Attorney, Agent, or Firm* — Foley & Lardner LLP

(57) ABSTRACT

This electronic control device comprises a first priority information table which is provided for each of a plurality of area electronic devices and to which priorities of the area electronic devices from which information is to be acquired are set, and a control unit which refers to the first priority information table when the control unit has determined, from an outside situation of a vehicle, that a state of the vehicle is to change, determines the area electronic device the priority of which is to be changed according to the state of the vehicle to change, instructs the determined area electronic device to change the priority, and acquires, from the area electronic device to which the change in priority is instructed, information the priority of which has been changed so as to have a higher priority.

15 Claims, 16 Drawing Sheets

(56) References Cited

U.S. PATENT DOCUMENTS

| | | | | |
|---|---|---|---|---|
| 2020/0059814 | A1* | 2/2020 | Nagamura | G08G 1/164 |
| 2020/0322830 | A1 | 10/2020 | Nagamura | |
| 2022/0274606 | A1 | 9/2022 | Matsuo et al. | |
| 2022/0416555 | A1 | 12/2022 | Yamada et al. | |
| 2023/0017336 | A1* | 1/2023 | He | G01S 13/865 |
| 2023/0102518 | A1* | 3/2023 | Paul | G06Q 10/063 701/1 |

OTHER PUBLICATIONS

Japanese Office Action issued in corresponding JP Application No. 2023-559217, dated Nov. 26, 2024 with English translation (6 pages).

* cited by examiner

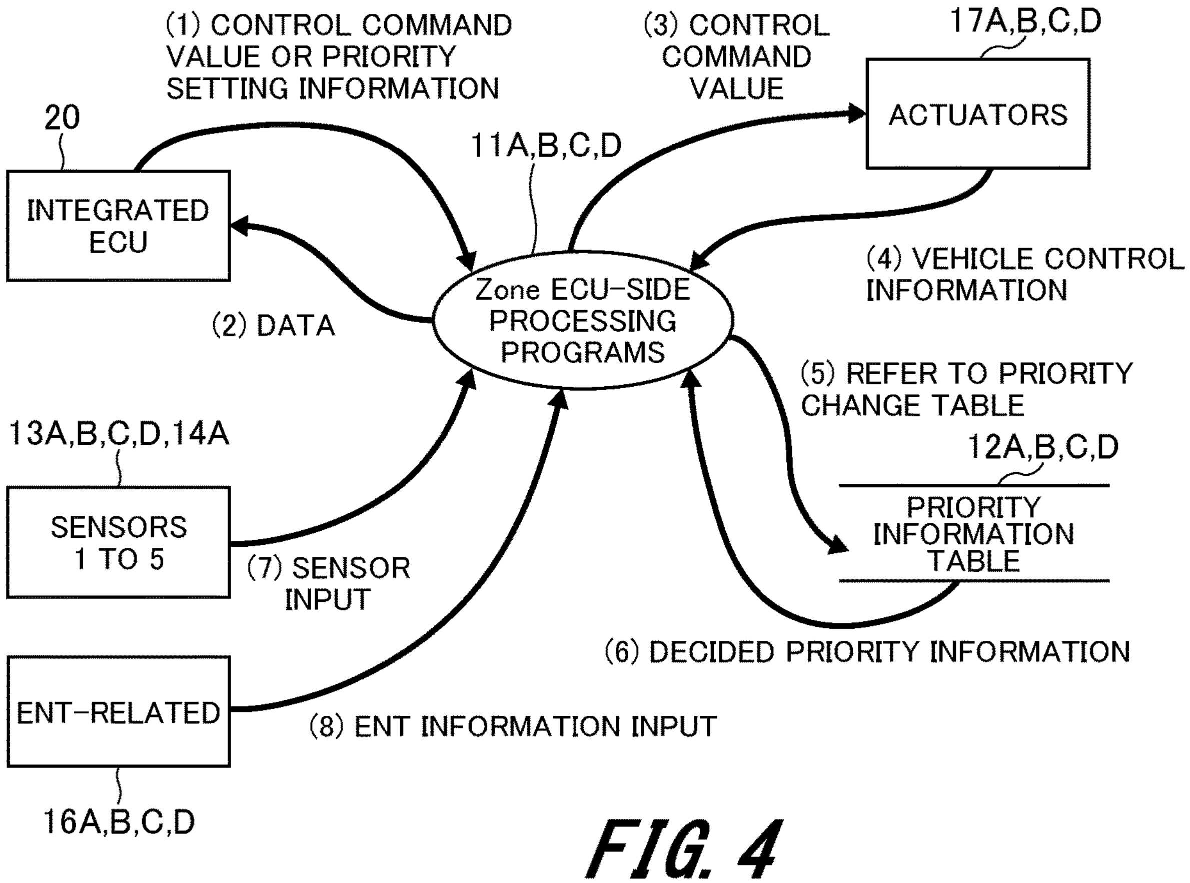
*FIG. 4*
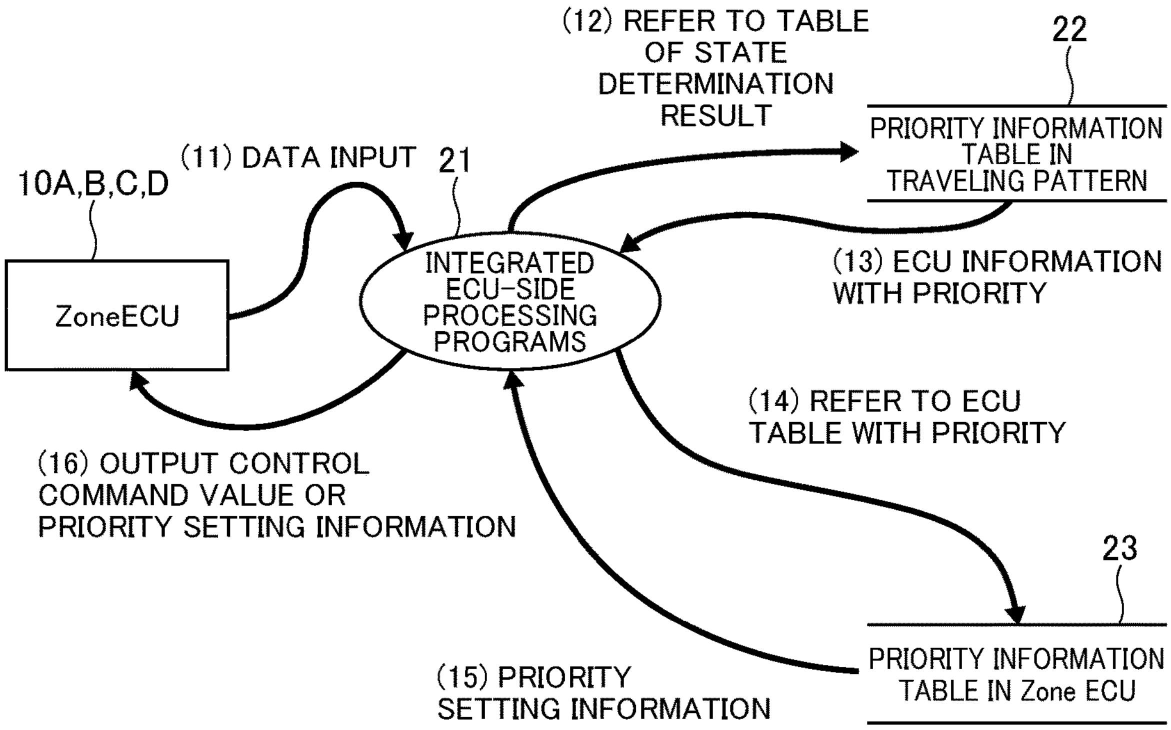

*FIG. 5*

PRIORITY INFORMATION TABLE OF Zone ECU 1 12A

| | SENSOR | ENT-RELATED | CONTROL INFORMATION |
|---|---|---|---|
| ZoneECU1 | MEDIUM | LOW | HIGH |

PRIORITY INFORMATION TABLE OF Zone ECU 2 12B

| | SENSOR | ENT-RELATED | CONTROL INFORMATION |
|---|---|---|---|
| ZoneECU2 | MEDIUM | LOW | HIGH |

PRIORITY INFORMATION TABLE OF Zone ECU 3 12C

| | SENSOR | ENT-RELATED | CONTROL INFORMATION |
|---|---|---|---|
| ZoneECU3 | MEDIUM | LOW | HIGH |

PRIORITY INFORMATION TABLE OF Zone ECU 4 12D

| | SENSOR | ENT-RELATED | CONTROL INFORMATION |
|---|---|---|---|
| ZoneECU4 | MEDIUM | LOW | HIGH |

*FIG. 6*

PRIORITY INFORMATION TABLE IN TRAVELING PATTERN 22

| TRAVELING PATTERN \ Zone ECU | ZoneECU1 (LEFT FRONT) | Zone ECU2 (RIGHT FRONT) | Zone ECU3 (RIGHT REAR) | ZoneECU4 (LEFT REAR) |
|---|---|---|---|---|
| NORMAL | MEDIUM | MEDIUM | MEDIUM | MEDIUM |
| LEFT TURN | HIGH | MEDIUM | MEDIUM | HIGH |
| RIGHT TURN | MEDIUM | HIGH | HIGH | MEDIUM |
| BACKWARD | MEDIUM | MEDIUM | HIGH | HIGH |
| ... | ... | ... | ... | ... |

FIG. 7

23

PRIORITY INFORMATION TABLE IN Zone ECU 1

| | SENSOR | ENT-RELATED | CONTROL DATA |
|---|---|---|---|
| NORMAL | MEDIUM | MEDIUM | HIGH |
| LEFT TURN | HIGH | MEDIUM | HIGH |
| RIGHT TURN | MEDIUM | MEDIUM | HIGH |
| BACKWARD | MEDIUM | MEDIUM | HIGH |
| ... | ... | ... | HIGH |

PRIORITY INFORMATION TABLE IN Zone ECU 2

| | SENSOR | ENT-RELATED | CONTROL DATA |
|---|---|---|---|
| NORMAL | MEDIUM | MEDIUM | HIGH |
| LEFT TURN | MEDIUM | MEDIUM | HIGH |
| RIGHT TURN | HIGH | MEDIUM | HIGH |
| BACKWARD | MEDIUM | MEDIUM | HIGH |
| ... | ... | ... | HIGH |

⋮

*FIG. 12*

ECU PRIORITY INFORMATION TABLE IN SENSOR FAILURE STATE

24

| TRAVELING PATTERN \ FAULTY SENSOR | SENSOR 1 (FRONT) | SENSOR 2 (LEFT FRONT) | SENSOR 3 (LEFT REAR) | SENSOR 4 (RIGHT FRONT) | SENSOR 5 (RIGHT REAR) | ... |
|---|---|---|---|---|---|---|
| NORMAL | ZoneECU1<br>ZoneECU2 | ZoneECU1<br>ZoneECU2 | – | ZoneECU1<br>ZoneECU3 | – | ... |
| LEFT TURN | – | ZoneECU1<br>ZoneECU4 | ZoneECU1<br>ZoneECU3 | – | – | ... |
| RIGHT TURN | – | – | – | ZoneECU1<br>ZoneECU3 | ZoneECU2<br>ZoneECU4 | ... |
| BACKWARD | – | – | ZoneECU1<br>ZoneECU3 | – | ZoneECU2<br>ZoneECU4 | ... |

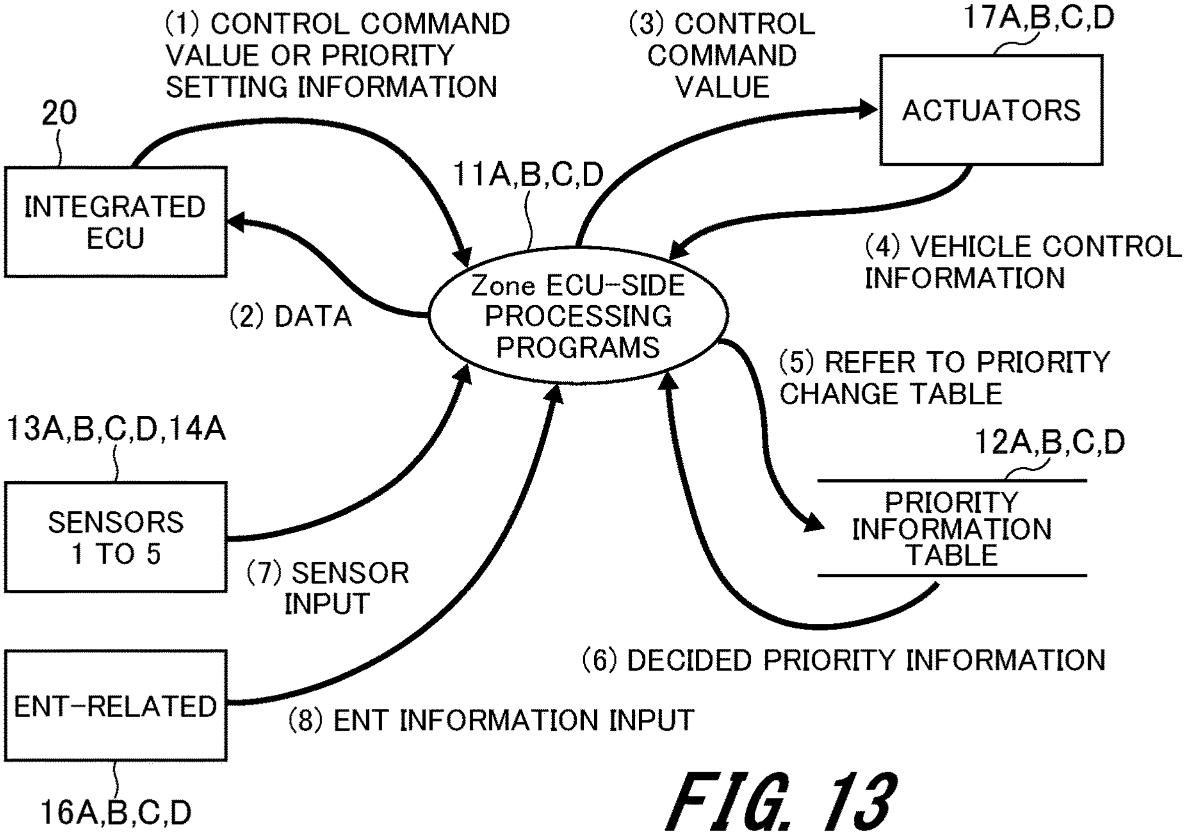
FIG. 13
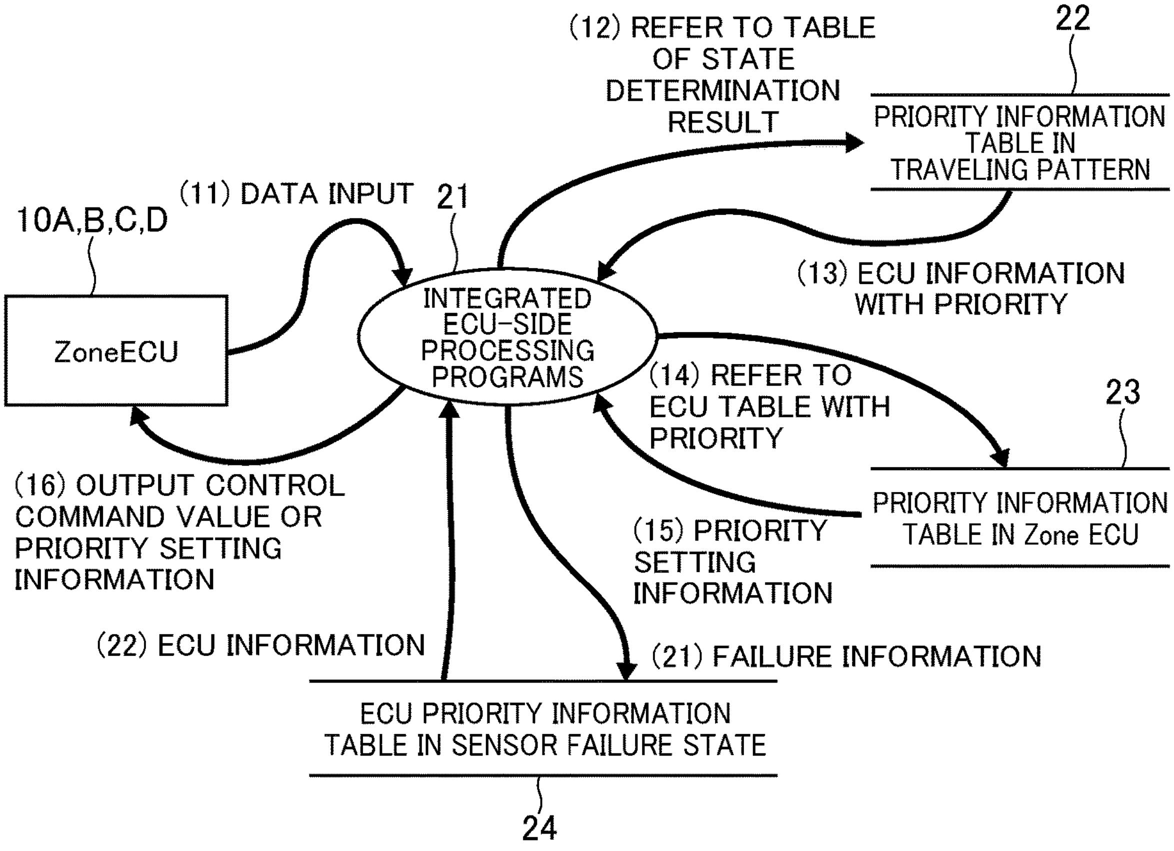

FIG. 15

PRIORITY INFORMATION TABLE IN TRAVELING PATTERN 22

| TRAVELING PATTERN \ Zone ECU | ZoneECU1 (LEFT FRONT) | Zone ECU2 (RIGHT FRONT) | Zone ECU3 (RIGHT REAR) | ZoneECU4 (LEFT REAR) |
|---|---|---|---|---|
| LEFT TURN START | MEDIUM | MEDIUM | MEDIUM | MEDIUM |
| DURING LEFT TURN | HIGH | MEDIUM | MEDIUM | HIGH |
| LEFT TURN END | MEDIUM | MEDIUM | MEDIUM | MEDIUM |

ELECTRONIC CONTROL DEVICE AND VEHICLE CONTROL SYSTEM

TECHNICAL FIELD

The present invention relates to an electronic control device and a vehicle control system.

BACKGROUND ART

In recent years, in order to reduce costs, a technique called a zone architecture for arranging a Zone electronic control unit (ECU), which is an example of an area electronic device, for each of areas obtained by segmenting a vehicle, and aggregating information of the Zone ECU in an integrated ECU has been developed.

As the level of the automatic driving system increases, the number of sensors connected to the Zone ECU increases. Various types of information are transmitted from the Zone ECU to the integrated ECU in accordance with a priority. For example, "high" is set as a priority of control information, and the control information is transmitted with the highest priority. On the other hand, "medium" is set as a priority of sensor information, and "low" is set as a priority of entertainment information. That is, the control information, the sensor information, and the entertainment information are transmitted from the Zone ECU to the integrated ECU in the described order. Incidentally, it is necessary to change the priority of data transfer depending on a state of a vehicle.

In the past, a method disclosed in Patent Literature 1 has been known as a method of setting the priorities of various types of information. Patent Literature 1 discloses that "In a case where automatic driving control is performed, it is possible to set a high priority to data from an external device located in an important peripheral area where whether or not an object is present should be checked.".

CITATION LIST

Patent Literature

Patent Literature 1: WO 2018/151179 A1

SUMMARY OF INVENTION

Technical Problem

However, in the method disclosed in Patent Literature 1, a priority of data obtained from an external communication device is set. In this method, a priority of a sensor desired to be acquired is hardly set depending on a state of a vehicle (for example, a left turn or the like).

The present invention has been made in light of the foregoing circumstance, and it is an object of the present invention change a priority of an area electronic device in accordance with a change in a state of a vehicle.

Solution to Problem

An electronic control device according to the present invention controls a vehicle on the basis of one or a plurality of pieces of information acquired from a plurality of area electronic devices disposed for each of areas obtained by segmenting the vehicle. The electronic control device includes a first priority information table which is disposed for each of the plurality of area electronic devices and in which priorities of the area electronic devices which acquire information are set, and a control unit which decides, when it is determined that a state of a vehicle is changed from an outside situation of the vehicle, the area electronic device whose priority is changed in accordance with the changing state of the vehicle with reference to the first priority information table, gives an instruction to change the priority to the decided area electronic device, and obtains information indicating that the priority has been changed to high from the area electronic device to which the instruction to change the priority is given.

Advantageous Effects of Invention

According to the present invention, since the priority of the area electronic device is changed in accordance with the change in the state of the vehicle, it is possible to preferentially obtain information from the area electronic device with the high priority.

BRIEF DESCRIPTION OF DRAWINGS

FIG. 4 is a functional configuration diagram of the vehicle control system according to the first embodiment of the present invention.

FIG. 5 is a table configuration diagram of a current priority information table disposed for each Zone ECU according to the first embodiment of the present invention.

FIG. 6 is a table configuration diagram of a priority information table in a traveling pattern according to the first embodiment of the present invention.

FIG. 7 is a table configuration diagram of a priority information table in the Zone ECU according to the first embodiment of the present invention.

FIG. 12 is a table configuration diagram of an ECU priority information table in a sensor failure state according to the second embodiment of the present invention.

FIG. 13 is a functional configuration diagram of the vehicle control system according to the second embodiment of the present invention.

FIG. 15 is a table configuration diagram of a priority information table in a traveling pattern according to a modification example of the first and second embodiments of the present invention.

DESCRIPTION OF EMBODIMENTS

Figure 1:
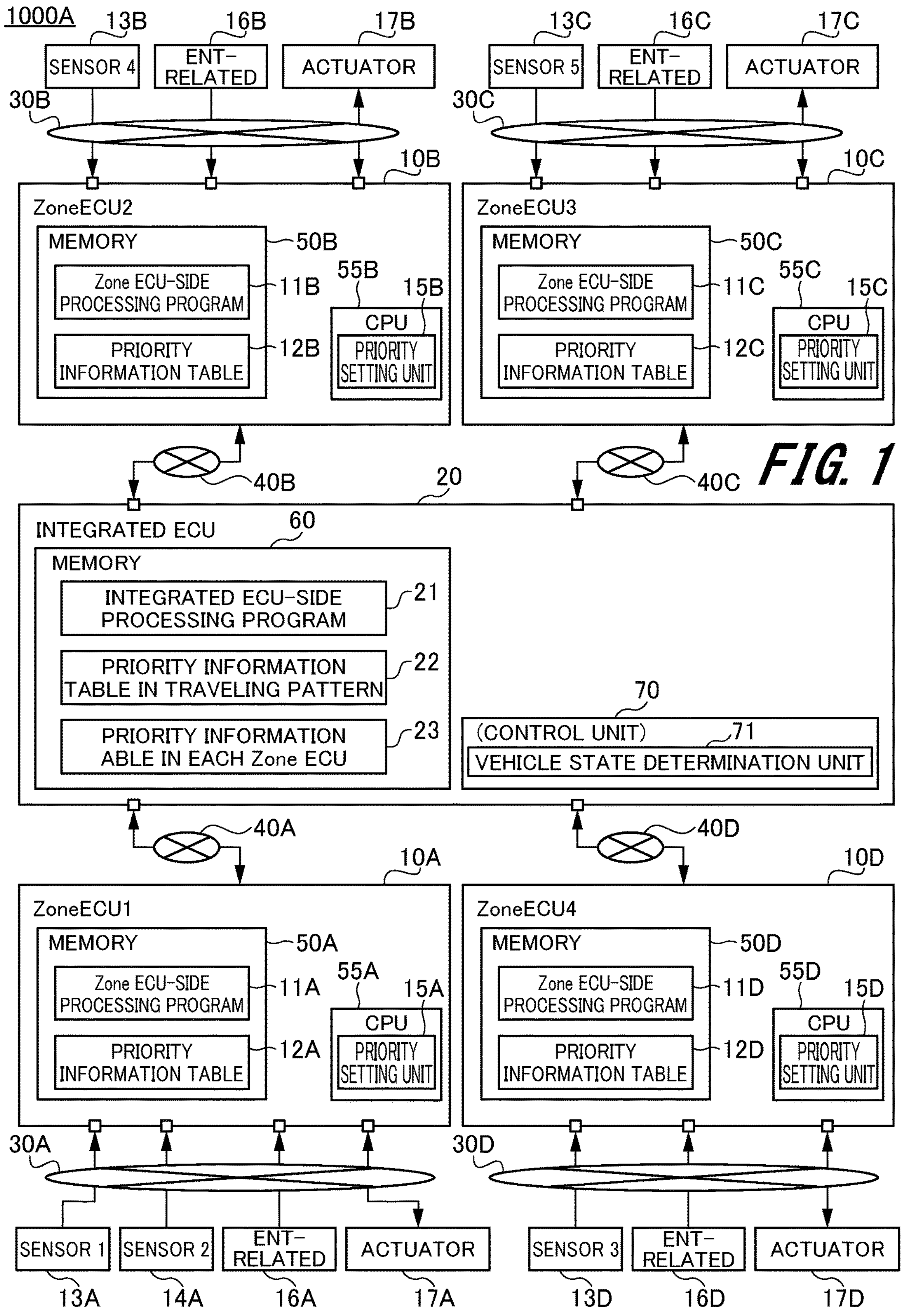
FIG. 1 is a block diagram illustrating an overall configuration example of a vehicle control system according to a first embodiment of the present invention.

Hereinafter, embodiments of the present invention will be described with reference to the accompanying drawings. In the present specification and the drawings, components having substantially the same function or configuration are denoted by the same reference numerals, and redundant description is omitted. Note that each embodiment described below does not limit inventions according to claims set forth below, and all of various elements and combinations thereof described in the embodiments are not necessarily essential to the solution of the invention.

In addition, in the following description, a process may be described with a "program" as a main operating entity. On the other hand, a program is executed by a processor (for example, a central processing unit (CPU)) to perform a process, using an appropriate storage resource (for example, a memory) and/or a communication interface device (for example, a port). Therefore, the entire process described below may be performed by the processor.

A process describing a program as a main operating entity may be a process performed by a device including a processor. Further, a dedicated hardware circuit that performs the entire or part of a process performed by a processor may be included. A computer program may be installed into a device from a program source. The program source may be, for example, a program distribution server or a computer readable non-transitory recording medium.

First Embodiment

FIG. 1 is a block diagram illustrating an overall configuration example of a vehicle control system according to a first embodiment.

A vehicle control system 1000A is an example of a control system that is mounted on a vehicle 600 (see FIG. 2 to be described later) such as an automobile, and controls an operation of the vehicle 600. The vehicle control system 1000A includes various sensors 13A (13B, 13C, 13D, and 14A), an entertainment-related information device 16A (16B, 16C, and 16D), various actuators 17A (17B, 17C, and 17D), and a Zone ECU 10A (10B, 10C, and 10D) that performs control for each area such as a direction (for example, left front, left rear, right front, and right rear) of the vehicle 600.

Further, the vehicle control system 1000A includes an integrated ECU 20 that aggregates data of the Zone ECU 10A (10B, 10C, and 10D) and performs recognition of an object outside the vehicle, recognition of the object, operation determination of the vehicle, and travel control of the vehicle. The electronic control device (integrated ECU 20) can control the vehicle (vehicle 600) on the basis of one or a plurality of pieces of information acquired from a plurality of area electronic devices (Zone ECUs 1 to 4) disposed for each of areas obtained by segmenting the vehicle (vehicle 600).

In the drawing, the entertainment-related information device 16A (16B, 16C, and 16D) is abbreviated as an "ENT-related". As an example of the entertainment information transmitted from the entertainment-related information device 16A (16B, 16C, and 16D) to the Zone ECU 10A (10B, 10C, and 10D), there is information indicating a current position of the vehicle 600 acquired from a car navigation system (not illustrated) mounted on the vehicle 600 or the like.

In the following description, the sensors 13A, 14A, 13B, 13C, and 13D are referred to as sensors 1, 2, 3, 4, and 5 or sensors 1 to 5, respectively. In a case in which the sensors 1 to 5 are not distinguished, they may be referred to only as "sensors". The sensors 1 to 5 are used to capture information of the surrounding environment of the vehicle 600, such as radio detection and ranging (Radar), light/laser imaging detection and ranging (LiDAR), and a camera. The sensors 1 to 5 output information, which can be acquired by each sensor, to any one of the Zone ECUs 1 to 4 to which the sensor is connected.

In the following description, the Zone ECU 10A (10B, 10C, and 10D) is referred to as the Zone ECUs 1, 2, 3, and 4 or the Zone ECU 1 to 4, respectively. However, in a case in which the Zone ECUs 1 to 4 is not distinguished, it may be referred to only as "Zone ECU". The Zone ECU is used as an example of the area electronic device. The Zone ECUs 1 to 4 are disposed in areas (directions) in the vehicle. The sensors arranged in the Zone ECU 1 to 4 can recognize the respective areas (directions) and are arranged at optimal positions.

The sensors 1 to 5, the entertainment-related information device 16A (16B, 16C, and 16D), the various actuators 17A (17B, 17C, and 17D), the Zone ECUs 1 to 4, and the integrated ECU 20 are configured to be communicable via an in-vehicle network 30A (30B, 30C, and 30D) and an in-vehicle network 40A (40B, 40C, and 40D).

The in-vehicle network 30A (30B, 30C, and 30D) and the in-vehicle network 40A (40B, 40C, and 40D) are configured with any communication network such as Ethernet (registered trademark) and CAN with Flexible Data-Rate (CAN-FD).

The Zone ECUs 1 to 4 include a CPU 55A (55B, 55C, and 55D) and a memory 50A (50B, 50C, 50D). The CPU 55A (55B, 55C, and 55D) reads a program stored in the memory 50A (50B, 50C, 50D), and executes each process in accordance with to the program.

The memory 50A (50B, 50C, 50D) is configured with, for example, a random access memory (RAM) and a read only memory (ROM). The memory 50A (50B, 50C, 50D) stores a Zone ECU-side processing program 11A (11B, 11C, and 11D) which is executed by the CPU 55A (55B, 55C, 55D) and information necessary for the process of the Zone ECU. The information necessary for the process of the Zone ECU is, for example, a priority information table 12A (12B, 12C, and 12D) which is referred to when the Zone ECUs 1 to 4 transmit data to the integrated ECU 20. A detailed configuration example of the priority information table 12A (12B, 12C, and 12D) will be described later with reference to FIG. 5.

Then, the CPU 55A (55B, 55C, and 55D) of the Zone ECU can implement a function of the priority setting unit 15A (50B, 50C, 50D) by executing the Zone ECU-side processing program 11A (11B, 11C, and 11D) which is read from the memory 50A (15B, 15C, 15D). The priority setting unit 15A (15B, 15C, and 15D) changes the priority of the priority information table 12A (12B, 12C, and 12D) on the basis of priority setting information input from the integrated ECU 20.

The integrated ECU 20 includes a CPU 70 and a memory 60. The CPU 70 executes each process in accordance with a program stored in the memory 60. For example, the CPU 70 is used as an example of a control unit according to the present embodiment. In a case in which it is determined that the state of the vehicle (vehicle 600) changes from a situation outside the vehicle (vehicle 600), the control unit decides the area electronic device (Zone ECUs 1 to 4) whose priority is to be changed in accordance with the changing state of the vehicle (vehicle 600) with reference to a first priority information table (priority information table 22 in the traveling pattern), gives an instruction to change the priority to the decided area electronic device (Zone ECUs 1 to 4), and obtains information with the priority changed to high from the area electronic device (Zone ECUs 1 to 4) to which the instruction to change the priority is given.

The memory 60 is configured with, for example, a RAM and a ROM, and stores an integrated ECU-side processing program 21 which is executed by the CPU 70 and information necessary for a process of the integrated ECU 20. The necessary information of the integrated ECU 20 is, for example, information stored in the priority information table 22 of the Zone ECUs 1 to 4 in the traveling pattern of the vehicle 600 or the priority information table 23 in each of the Zone ECUs 1 to 4. Here, the first priority information table (the priority information table 22 in the traveling pattern) is disposed for each of a plurality of area electronic devices (Zone ECUs 1 to 4), and the priority of the area electronic device (Zone ECUs 1 to 4) that acquires information is set. A second priority information table (the priority information table 23 in each Zone ECU) specifies, for each type of information transmitted from the area electronic device (Zone ECUs 1 to 4), a relationship between the state of the vehicle (vehicle 600) and the priority of the information transmitted from the area electronic device (Zone ECUs 1 to 4).

Then, the CPU 70 of the integrated ECU 20 can implement a function of the vehicle state determination unit 71 by executing the integrated ECU-side processing program 21 which is read from the memory 60. The vehicle state determination unit (vehicle state determination unit 71) included in the control unit (CPU 70) determines the change in the state of the vehicle (vehicle 600) on the basis of the external situation, determines the area electronic device (Zone ECUs 1 to 4) that changes the priority in a case in which the priority specified in the second priority information table (priority information table 23 in each Zone ECU) before the state of the vehicle (vehicle 600) changes is different from the priority specified in the second priority information table (priority information table 23 in each Zone ECU) after the state of the vehicle (vehicle 600) changes, and gives an instruction to change the priority to the decided area electronic device (Zone ECUs 1 to 4). Therefore, the vehicle state determination unit 71 can determine the state of the vehicle 600 as the vehicle state on the basis of various data acquired from the Zone ECUs 1 to 4, and can recognize the traveling pattern of the vehicle 600.

The various entertainment-related information devices 16A (16B, 16C, and 16D) are information devices which are not necessary for travel control of the vehicle 600, such as navigation information or music information.

The various actuators 17A (17B, 17C, and 17D) include one or more actuators that control the operations of associated devices in association with an accelerator, a brake, a steering, and the like (not illustrated) which are operated by a driver of the vehicle 600. The various actuators 17A (17B, 17C, and 17D) control the operations of traveling-related devices mounted on the vehicle 600 on the basis of control information input from the integrated ECU 20. Further, the various actuators 17A (17B, 17C, and 17D) notify the integrated ECU 20 of vehicle control information indicating a current control state of the vehicle 600. The integrated ECU 20 can give an instruction for control information such as acceleration/deceleration and fine adjustment of steering to the various actuators 17A (17B, 17C, and 17D) on the basis of the vehicle control information notified from the various actuators 17A (17B, 17C, and 17D).

Note that, in the following description, a program may be described as a main operating entity for convenience, but an actual main executing entity is the CPU 55A (55B, 55C, 55D, and 70) that executes the program.

Further, the integrated ECU 20 may include an arithmetic element capable of performing various types of information processing such as, for example, a field-programmable gate array (FPGA) in addition to the CPU 70. Further, the integrated ECU 20 may include, as the memory 60, a magnetic storage medium such as a hard disk drive (HDD) or a semiconductor storage medium such as a solid state drive (SSD) in addition to the RAM and the ROM. Various types of programs, parameters, or the like may be stored in the magnetic storage media or the semiconductor storage media.

Next, an environment configuration used in the first embodiment will be described.

Figure 2:
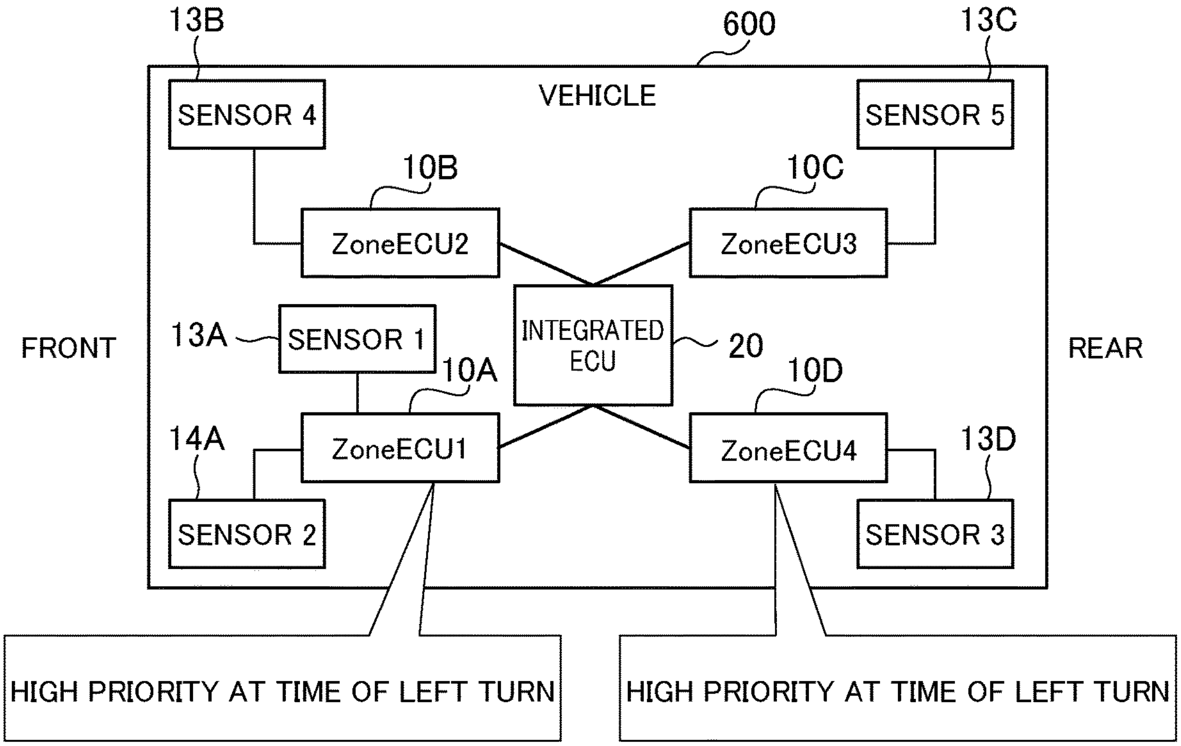
FIG. 2 is a schematic diagram illustrating an arrangement example of a sensor, a Zone ECU, and an integrated ECU in a vehicle according to the first embodiment of the present invention.

FIG. 2 is a schematic diagram illustrating an arrangement example of the sensors 1 to 5, the Zone ECUs 1 to 4, and the integrated ECU 20 in the vehicle 600 according to the first embodiment.

An arrangement position of the sensor (sensors 1 to 5) includes any one of the front right, the front left, the rear right, and the rear left of the vehicle (vehicle 600). For example, the sensor 1 is installed at the front center of the vehicle 600, the sensor 2 is installed at the front left, the sensor 3 is installed at the rear left, the sensor 4 is installed at the front right, and the sensor 5 is installed at the rear right. The vehicle 600 is segmented into at least four areas. For example, the front left, the rear left, the front right, and the rear right of the vehicle 600 are segmented as areas. The Zone ECUs 1 to 4 are disposed for each area.

A plurality of area electronic devices (Zone ECUs 1 to 4) are arranged in the vicinity of the arrangement positions of the sensors (sensors 1 to 5) arranged in the vehicle (vehicle 600).

For example, the sensors 1 and 2 are connected to the Zone ECU 1 disposed at the front left of the vehicle 600.

The sensor 3 is connected to the Zone ECU 4 disposed at the rear left of the vehicle 600.

The sensor 4 is connected to the Zone ECU 2 disposed at the front right of the vehicle 600.

The sensor 5 is connected to the Zone ECU 3 disposed at the rear right of the vehicle 600.

Further, the Zone ECUs 1 to 4 are connected to the integrated ECU 20 disposed near the center of the vehicle 600.

Figure 3:
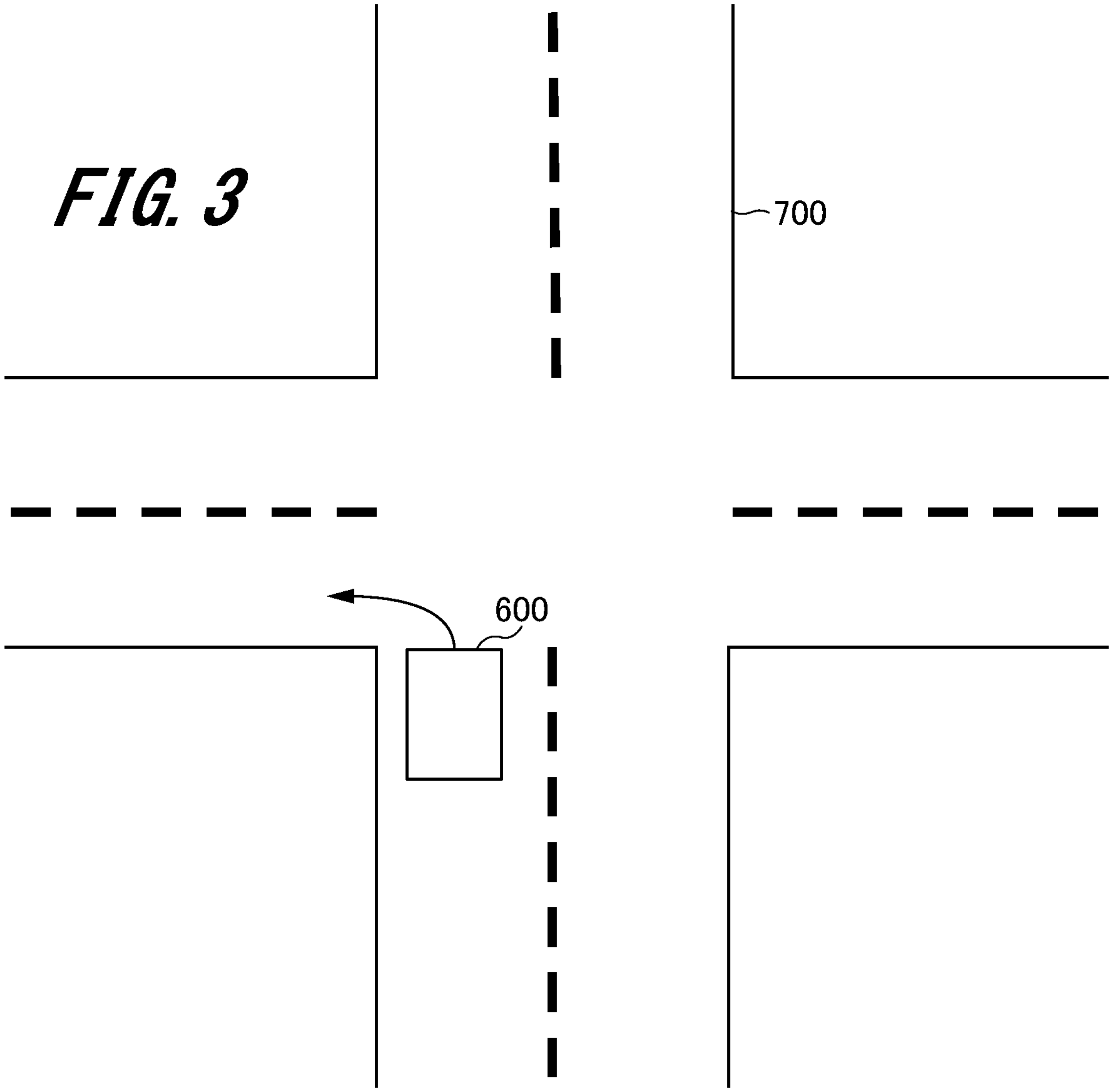
FIG. 3 is a diagram illustrating an example of a situation in which the vehicle according to the first embodiment of the present invention is turning left as viewed from above.

FIG. 3 is a diagram illustrating an example in which a situation in which the vehicle 600 is turning left is viewed from above.

Here, an example of the traveling pattern when the vehicle 600 turns left at intersection 700 is illustrated.

In the present embodiment, the traveling pattern of vehicle 600 is specified in advance. Then, the priority of the Zone ECU changes depending on the traveling pattern. For example, in the traveling pattern in which the vehicle 600 turns left, the priorities of the Zone ECUs 1 and 4 (see FIG.

2) arranged in the area on the left side of the vehicle 600 are higher than those of the other Zone ECUs 2 and 3. Therefore, the integrated ECU 20 preferentially acquires information from the Zone ECUs 1 and 4, and executes a process on the basis of the information.

FIG. 4 is a functional configuration diagram of the vehicle control system 1000A according to the first embodiment. In FIG. 4, a configuration example of the respective functions of the vehicle control system 1000A is illustrated in a data flow diagram format. FIG. 4 illustrates a format also called a state transition diagram or a state machine diagram, and briefly illustrates the respective units of the vehicle control system 1000A and the flow of information in a program. The vehicle state determination unit (vehicle state determination unit 71) determines the state of the vehicle (vehicle 600) from the external situation on the basis of the state machine that specifies the state of the vehicle (vehicle 600) and the transition of the state of the vehicle (vehicle 600).

Further, the priority information table will be described with reference to FIGS. 5 to 7 which will be described later. The vehicle control system 1000A includes the Zone ECU-side priority information table 12A (12B, 12C, and 12D) and the integrated ECU-side priority information tables 22 and 23.

As described above, the respective functions according to the present embodiment are implemented such that the respective processing programs executed by the Zone ECUs 1 to 4 and the integrated ECU 20 are implemented by the CPU 55A (55B, 55C, 55D, 70) executing the respective processing programs.

First, an example of a process of the Zone ECUs 1 to 4 illustrated on the upper side of FIG. 4 will be described.

The Zone ECU-side processing program 11A (11B, 11C, and 11D) is executed by the Zone ECU-side CPU 55A (55B, 55C, and 55D) in accordance with the following procedures (1) to (8). However, the procedures (1) to (8) are not necessarily performed in the described order, and some procedures may be performed in parallel or in reverse order.

(1) Upon receiving a control command value or priority setting information from the integrated ECU 20, the Zone ECU-side processing program 11A (11B, 11C, and 11D) performs control on each unit. Here, the information received from the integrated ECU 20 may be at least one of the control command value and the priority setting information of the vehicle 600.

(2) Then, the Zone ECU-side processing program 11A (11B, 11C, and 11D) returns data associated with the information received from the integrated ECU 20 to the integrated ECU 20. This data includes any one of vehicle control information received from the actuator 17A (17B, 17C, and 17D) by the Zone ECU-side processing program 11A (11B, 11C, and 11D), priority information decided with reference to a priority information table 12A (12B, 12C, and 12D) illustrated in FIG. 5 to be described later, information detected by the sensors 1 to 5 (described as "sensor input" in the drawings), and entertainment information received from the entertainment-related information device 16A (16B, 16C, and 16D).

(3) The Zone ECU-side processing program 11A (11B, 11C, and 11D) outputs the control command value input from the integrated ECU 20 to the actuator 17A (17B, 17C, and 17D).

(4) Then, the actuator 17A (17B, 17C, and 17D) outputs the vehicle control information to the Zone ECU-side processing program 11A (11B, 11C, and 11D).

(5) In a case in which the priority of information to be acquired is changed, the Zone ECU-side processing program 11A (11B, 11C, and 11D) decides the priority to be changed in the priority information table 12A (12B, 12C, and 12D) with reference to the priority information table 12A (12B, 12C, and 12D).

(6) Then, the Zone ECU-side processing program 11A (11B, 11C, and 11D) acquires the decided priority information.

(7) Information detected by the sensors 1 to 5 is input to the Zone ECU-side processing program 11A (11B, 11C, and 11D).

(8) Further, the entertainment information is input from the entertainment-related information device 16A (16B, 16C, and 16D) to the Zone ECU-side processing program 11A (11B, 11C, and 11D).

The type of data output from the Zone ECU-side processing program 11A (11B, 11C, and 11D) to the integrated ECU 20 is decided on the basis of the priority information stored in the priority information table 12A (12B, 12C, and 12D). Therefore, when the Zone ECU-side processing program 11A (11B, 11C, and 11D) rewrites the priority information in the priority information table 12A (12B, 12C, and 12D) and decides the priority information, the Zone ECU-side processing program 11A (11B, 11C, and 11D) outputs the sensor information or the control information to the integrated ECU 20 in accordance with the decided priority information.

Here, the priority information table on the Zone ECU side will be described.

FIG. 5 is a table configuration diagram of the current priority information table 12A (12B, 12C, and 12D) disposed for each of the Zone ECUs 1 to 4.

The priority information table 12A (12B, 12C, and 12D) is a table in which the priority of information output from a target Zone ECU is set. As illustrated in FIGS. 1 and 5, the priority information table 12A (12B, 12C, and 12D) is prepared for each Zone ECU. Upon receiving the priority change information from the integrated ECU 20, each Zone ECU updates information in the priority information table 12A (12B, 12C, and 12D). For example, when the Zone ECU 1 receives priority change information indicating that the sensor is "high" from the integrated ECU 20, the Zone ECU-side processing program 11A illustrated in FIG. 4 changes the sensor in the priority information table 12A to "high".

Next, an example of a process of the integrated ECU-side processing program 21 illustrated on the lower side of FIG. 4 will be described. The processing of the integrated ECU-side processing program 21 illustrated on the lower side of FIG. 4 is performed in accordance with the following procedures (11) to (16). However, the procedures (11) to (16) are not necessarily performed in the described order, and some procedures may be performed in parallel or in reverse order.

(11) The integrated ECU-side processing program 21 receives information from the Zone ECUs 1 to 4. In the drawings, receiving the information from the Zone ECUs 1 to 4 is indicated by "data input". Then, the integrated ECU-side processing program 21 determines the vehicle state on the basis of the received information.

(12) At this time, the integrated ECU-side processing program 21 refers to the priority information table 22 in the traveling pattern on the basis of the state determination result (for example, the traveling pattern of the vehicle 600).

(13) Then, the integrated ECU-side processing program 21 decides the Zone ECU from which information is preferentially acquired.

(14) Next, the integrated ECU-side processing program 21 refers to the priority information table 23 in the Zone ECU on the basis of the Zone ECU with priority decided from among the Zone ECUs 1 to 4.

(15) Then, the integrated ECU-side processing program 21 decides the priority setting information in each Zone ECU according to the traveling pattern of the vehicle 600, which is decided on the basis of the priority information table 23 in the Zone ECU.

(16) Then, the integrated ECU-side processing program 21 outputs the control command value or the priority setting information of the vehicle 600 to the Zone ECUs 1 to 4. Note that the information output from the integrated ECU-side processing program 21 to the Zone ECUs 1 to 4 may be at least one of the control command value and the priority setting information of the vehicle 600.

Here, two types of priority information tables on the integrated ECU side will be described. As illustrated in FIGS. 1 and 4, two types of tables, that is, the priority information table 22 in the traveling pattern and the priority information table 23 in each Zone ECU are disposed as the priority information table on the integrated ECU side.

FIG. 6 is a table configuration diagram of the priority information table 22 in the traveling pattern.

The integrated ECU 20 can decide the priority of each Zone ECU on the basis of the vehicle state with reference to the priority information table 22 in the traveling pattern. For example, in a case in which the vehicle state is normal (for example, straight traveling), the priority information at the time of "normal" is used as the traveling pattern of the priority information table 22 in the traveling pattern. That is, the priorities of the Zone ECUs 1 to 4 are "medium".

Here, when the integrated ECU-side processing program 21 recognizes that the vehicle state, that is, the traveling pattern has changed to the left turn, the priorities of the Zone ECU 1 and the Zone ECU 4 is increased.

FIG. 7 is a table configuration diagram of the priority information table 23 in the Zone ECU.

The priority information table 23 in the Zone ECU is a table in which the integrated ECU-side processing program 21 decides the priorities of the sensor, the entertainment-related, and control data on the basis of the vehicle state. FIG. 7 illustrates an example of the priority information table in the Zone ECUs 1 and 2. The priority information tables in the other Zone ECUs 3 and 4 are not illustrated.

For example, when the vehicle 600 enters the left turn state, the traveling pattern is changed to "left turn". Therefore, the integrated ECU-side processing program 21 sets the priorities of the sensor and the control data to "high" with reference to the priority information tables in the Zone ECU 1 and the Zone ECU 4. Thereafter, the integrated ECU-side processing program 21 outputs the priority information in which the priorities of the sensor and the control data are changed to "high" to the Zone ECUs 1 to 4.

Next, examples of specific processes of the Zone ECU and the integrated ECU 20 will be described.

First, a process of the Zone ECU side will be described.

Figure 8:
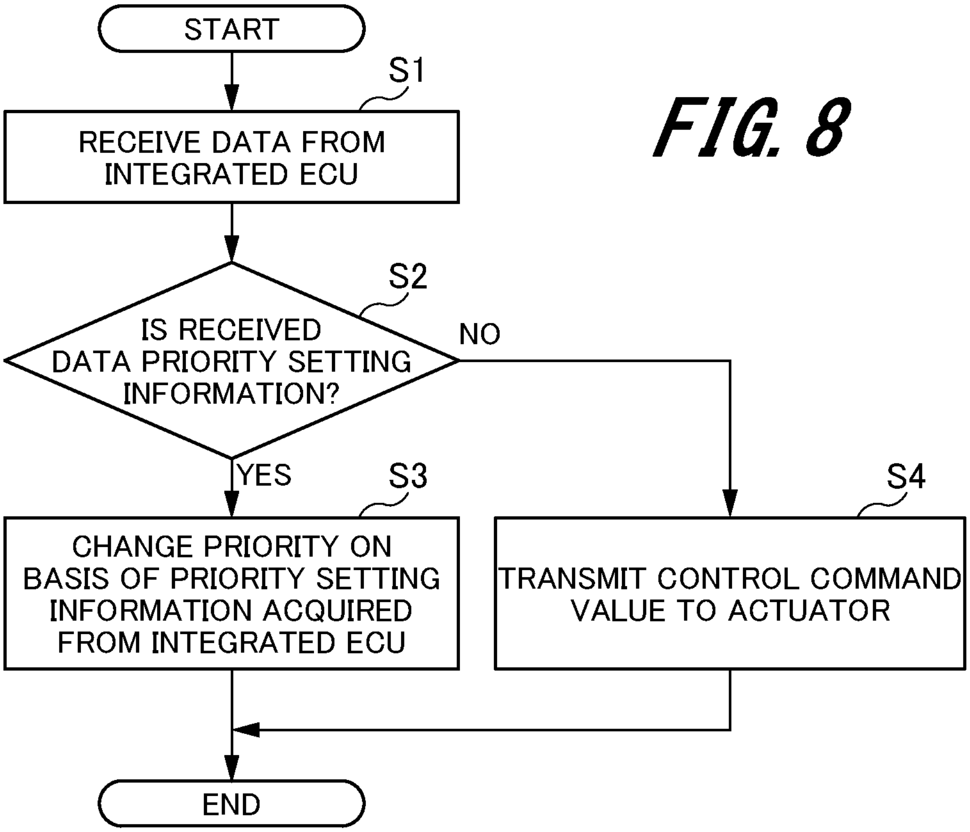
FIG. 8 is a flowchart illustrating an example of a process of a Zone ECU side according to the first embodiment of the present invention.

FIG. 8 is a flowchart illustrating an example of the process of the Zone ECU side. Here, an example of a process of the priority setting unit 15A (15B, 15C, and 15D) illustrated in FIG. 1 will be mainly described.

The process of the Zone ECU side is executed, for example, when various types of data are received from the integrated ECU side, the sensor, the entertainment-related, or the actuator.

First, upon receiving various types of data from integrated ECU 20 (S1), priority setting unit 15A (15B, 15C, and 15D) analyzes the received data. Next, the priority setting unit 15A (15B, 15C, and 15D) determines whether or not the received data is the priority setting information as a result of the analysis (S2).

In a case in which the analyzed data is the priority setting information (YES in S2), the priority setting unit 15A (15B, 15C, and 15D) changes the priority of the priority information table 12A (12B, 12C, and 12D) on the basis of the priority setting information acquired from the integrated ECU 20, and ends the present process.

On the other hand, in a case in which the analyzed data is not the priority setting information (NO in S2), the data is the control command value. Therefore, the priority setting unit 15A (15B, 15C, and 15D) transmits the received data (control command value) to the actuator 17A (17B, 17C, and 17D) (S4), and ends the present process.

Next, a process of the integrated ECU side will be described.

Figure 9:
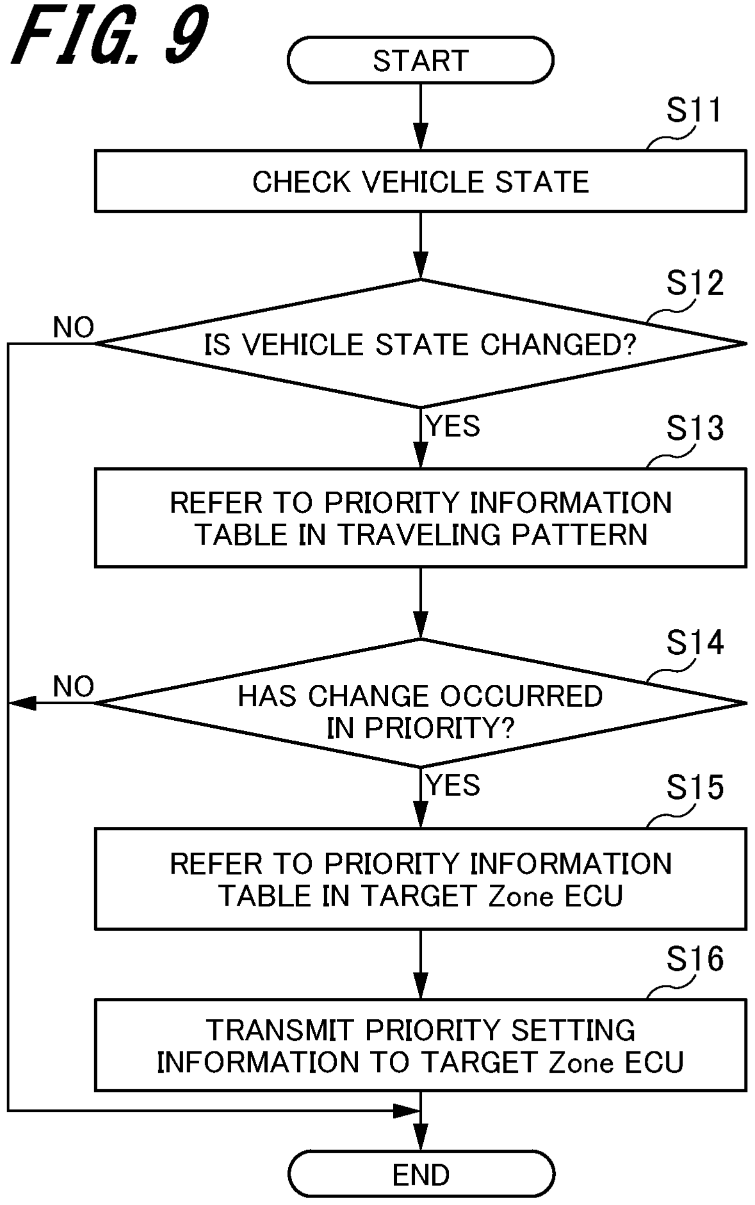
FIG. 9 is a flowchart illustrating an example of a process of an integrated ECU side according to the first embodiment of the present invention.

FIG. 9 is a flowchart illustrating an example of the process of the integrated ECU side according to the first embodiment. Here, an example of a process of the vehicle state determination unit 71 (see FIG. 1) will be mainly described.

First, the vehicle state determination unit 71 checks the vehicle state on the basis of the data received from each Zone ECU (S11). Then, the vehicle state determination unit 71 determines whether or not there is a change in the vehicle state on the basis of the received data (S12).

In a case in which there is a change in the vehicle state (YES in S12), the vehicle state determination unit 71 determines the traveling pattern on the basis of the confirmed vehicle state. Then, the vehicle state determination unit 71 checks the priority of each Zone ECU in the traveling pattern with reference to the priority information table 22 in the traveling pattern (S13).

Further, the vehicle state determination unit 71 determines whether or not there is a change in the priority of each Zone ECU with the change in the vehicle state on the basis of each Zone ECU in the traveling pattern (S14). In a case in which the priority of each Zone ECU is changed (YES in S14), the vehicle state determination unit 71 acquires the priority setting information in the Zone ECU with reference to the priority information table 23 in the Zone ECU whose priority is to be changed (indicated by "target Zone ECU" in the drawing) (S15). Then, the vehicle state determination unit 71 transmits the priority setting information to the Zone ECU whose priority is to be changed (S16), and ends the present process.

On the other hand, when there is no change in the vehicle state (NO in S12) or when there is no change in the priority (NO in S14), the integrated ECU-side processing program 21 ends the present process.

In the vehicle control system 1000A according to the first embodiment described above, the integrated ECU 20 holds the priority setting information of the Zone ECU, and dynamically changes the priority setting information of the Zone ECU with high priority in accordance with the traveling pattern of the vehicle 600 that can be recognized on the basis of the change in the vehicle state or the state outside the vehicle. On the other hand, under the normal situations, the Zone ECU transfers data to the integrated ECU 20 in accordance with the statically decided priority. As described above, the integrated ECU 20 changes the priority of the sensor in the priority information table 12A (12B, 12C, and 12D) of the Zone ECU with high priority according to the vehicle state or the state outside the vehicle, so that it is possible to early acquire the sensor information with high priority.

For example, when the vehicle 600 turns left, it is necessary for the integrated ECU 20 to check whether or not there is a person or an obstacle on the left side of the vehicle 600, and the sensor information that can be acquired from the sensors 2 and 3 arranged on the left side of the vehicle 600 can be obtained earlier than the other sensor information, and used for control of the vehicle 600. Further, the integrated ECU 20 can allocate resources required for the process to Zone ECUs with high priority.

Second Embodiment

Next, a vehicle control system according to a second embodiment of the present invention will be described with reference to FIGS. 10 to 14. In the vehicle control system according to the second embodiment, when some of the sensors mounted on the vehicle 600 have a failure, the integrated ECU 20 increases the priority of the Zone ECU to which other sensors capable of covering recognition ranges of the faulty sensors are connected, then acquires the sensor information, and controls the traveling of the vehicle 600.

Figure 10:
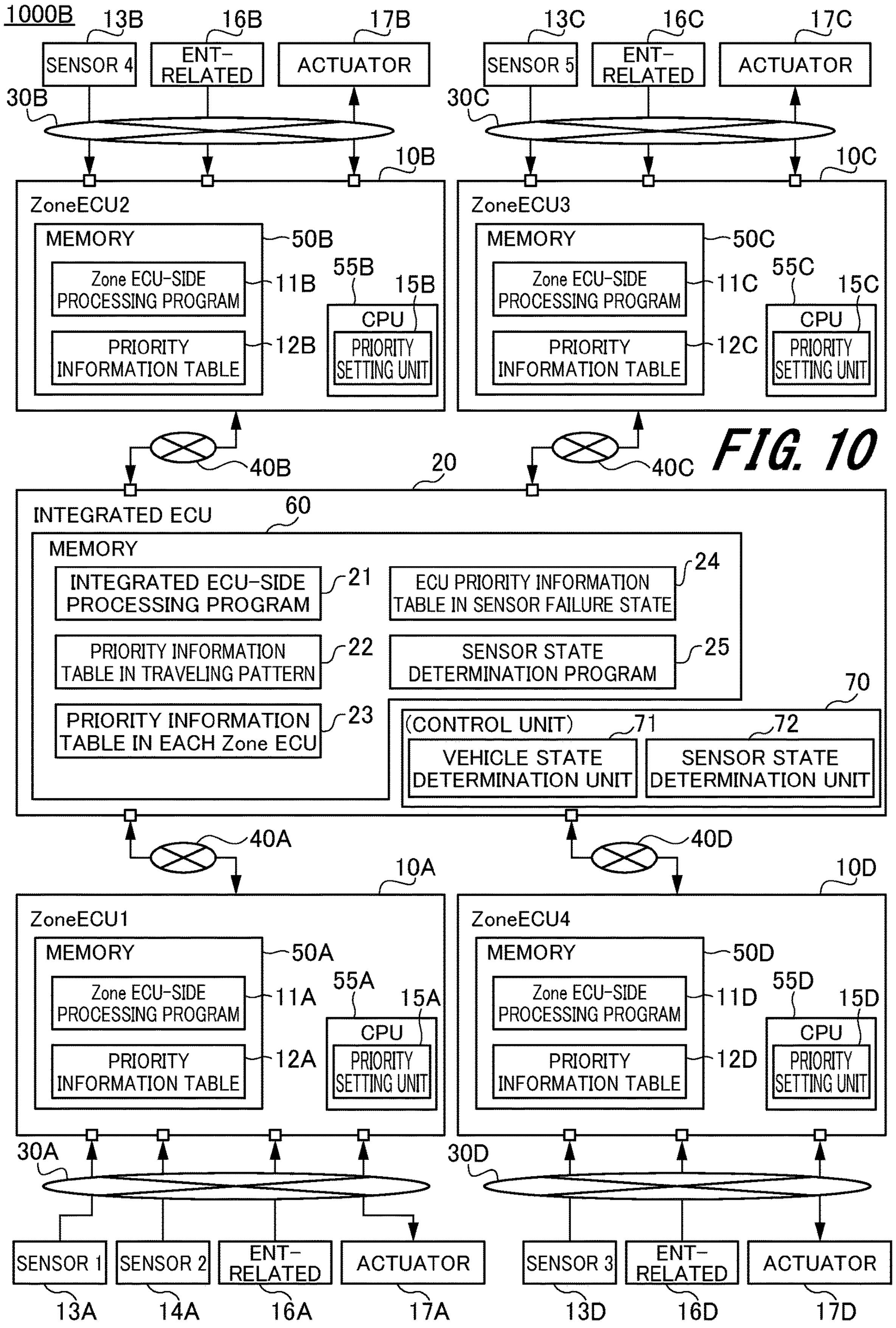
FIG. 10 is a block diagram illustrating an overall configuration example of a vehicle control system according to a second embodiment of the present invention.

FIG. 10 is a block diagram illustrating an overall configuration example of a vehicle control system 1000B according to the second embodiment.

As compared with the vehicle control system 1000A according to the first embodiment, in the vehicle control system 1000B according to the second embodiment, an ECU priority information table 24 in a sensor failure state and a sensor state determination program 25 are stored in the memory 60 of the integrated ECU 20. The control unit (CPU 70) includes a sensor state determination unit (sensor state determination unit 72) that determines the state of the sensor (sensors 1 to 5) for recognizing the outside situation, which is connected to each of a plurality of area electronic devices (Zone ECUs 1 to 4). Therefore, the CPU 70 of the integrated ECU 20 can implement a function of the sensor state determination unit 72 by executing the sensor state determination program 25 which is read from the memory 60. The sensor state determination unit 72 can determine a state (presence or absence of failure or the like) of the sensors 1 to 5 as a sensor state on the basis of various types of data acquired from the Zone ECUs 1 to 4.

Figure 11:
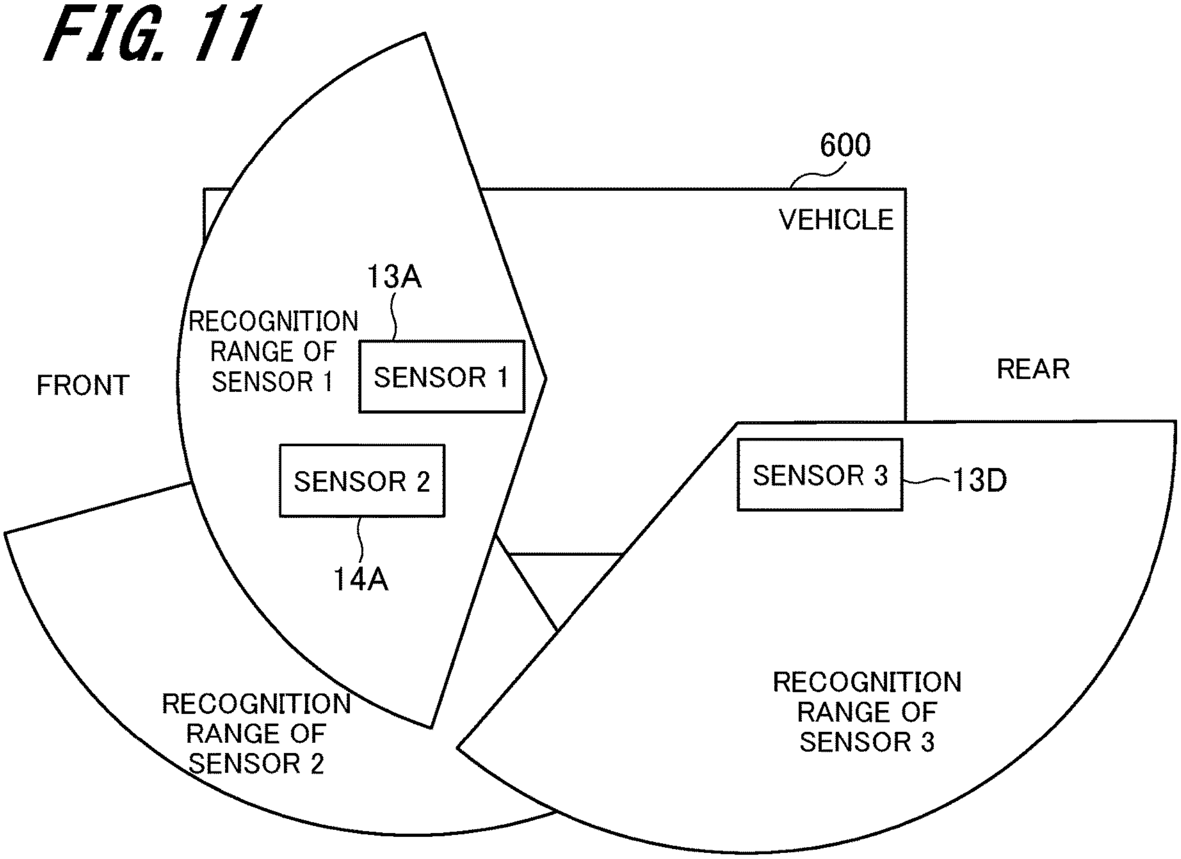
FIG. 11 is a diagram illustrating a recognition range of a sensor mounted on a vehicle according to the second embodiment of the present invention.

FIG. 11 is a diagram illustrating recognition ranges of the sensors 1 to 3 mounted on the vehicle 600. Here, an example of the recognition ranges of the sensors 1 to 3 among the sensors 1 to 5 mounted on the vehicle 600 is illustrated as illustrated in FIG. 2.

For example, it can be seen that the sensor 1 sets the front of the vehicle 600 as the recognition range, the sensor 2 sets the left front of the vehicle 600 as the recognition range, and the sensor 3 sets the left rear of the vehicle 600 as the recognition range. The recognition range of each sensor is indicated in a fan shape substantially centered on each sensor.

Further, FIG. 11 illustrates that the recognition range of the sensor 2 can be covered by the recognition ranges of the sensor 1 and the sensor 3. Therefore, even when the sensor 2 has a failure, the integrated ECU 20 acquires the information obtained from the sensor 1 and the sensor 3 via the Zone ECUs 1 and 4, thereby causing no trouble in traveling of the vehicle 600. Therefore, the vehicle state determination unit (vehicle state determination unit 71) increases the priorities of the area electronic devices (Zone ECUs 1 to 4) to which other sensors (sensors 1 and 3) capable of covering the recognition range of the sensor (sensor 2), which is determined to have a failure by the sensor state determination unit (sensor state determination unit 72), are connected. The failure of the sensor 2 described above is merely an example, and in the vehicle 600, the sensors are redundantly configured such that the recognition ranges of a plurality of sensors overlap at various places.

FIG. 12 is a table configuration diagram of the ECU priority information table 24 in the sensor failure state according to the second embodiment.

In the ECU priority information table 24, the horizontal axis indicates a faulty sensor, and the vertical axis indicates the traveling pattern as the vehicle state. Then, when it is determined that the sensor has a failure, the sensor state determination unit 72 (see FIG. 10) decides the Zone ECU whose priority is to be increased on the basis of the current vehicle state with reference to the ECU priority information table 24.

For example, when the vehicle 600 starts turning left while the sensor 2 has a failure, the integrated ECU 20 increases the priority of the Zone ECU 1 connected to the sensor 1 and the Zone ECU 4 connected to the sensor 3. Therefore, the integrated ECU 20 can obtain sensor information in which the recognition range of the faulty sensor 2 is covered by the recognition ranges of the sensors 1 and 3 which are not faulty. Therefore, even in a case in which any of the sensors 1, 3, 4, and 5 have a failure in addition to the sensor 2, the priority of the Zone ECU connected to the sensor capable of covering the recognition range of the faulty sensor is increased.

FIG. 13 is a functional configuration diagram of the vehicle control system 1000B according to the second embodiment. In FIG. 13, a configuration example of the respective functions of the vehicle control system 1000B is illustrated in a data flow diagram format. In FIG. 13, the respective units of the vehicle control system 1000B and the flow of information in the program are briefly illustrated.

Since the Zone ECU-side processing program 11A (11B, 11C, and 11D) illustrated on the upper side of FIG. 13 is substantially the same as that of the first embodiment described with reference to FIG. 4, a detailed description thereof will be omitted.

The integrated ECU-side processing program 21 illustrated on the lower side of FIG. 13 will be described.

Note that processes in (11) to (16) in the flow of information illustrated on the lower side of FIG. 13 are substantially the same as the example of the process of the integrated ECU-side processing program 21 illustrated on the lower side of FIG. 4.

(21) In a case in which the integrated ECU-side processing program 21 (the vehicle state determination unit 71 illustrated in FIG. 1) determines that the vehicle state has not changed on the basis of the information received from the Zone ECUs 1 to 4, the sensor state determination program 25 (the sensor state determination unit 72 illustrated in FIG. 10) determines the sensor states of the respective sensors 1 to 5.

(22) Then, in a case in which the sensor state determination program 25 determines that a failure has occurred in any of the sensors 1 to 5, the integrated ECU-side processing program 21 determines whether or not there is a change in the priority of the Zone ECU with reference to the ECU priority information table 24 in the sensor state. Thereafter, the integrated ECU-side processing program 21 acquires information of the Zone ECU whose priority has been changed. Then, the integrated ECU-side processing program 21 outputs the priority setting information to the Zone ECU whose priority has been changed.

Figure 14:
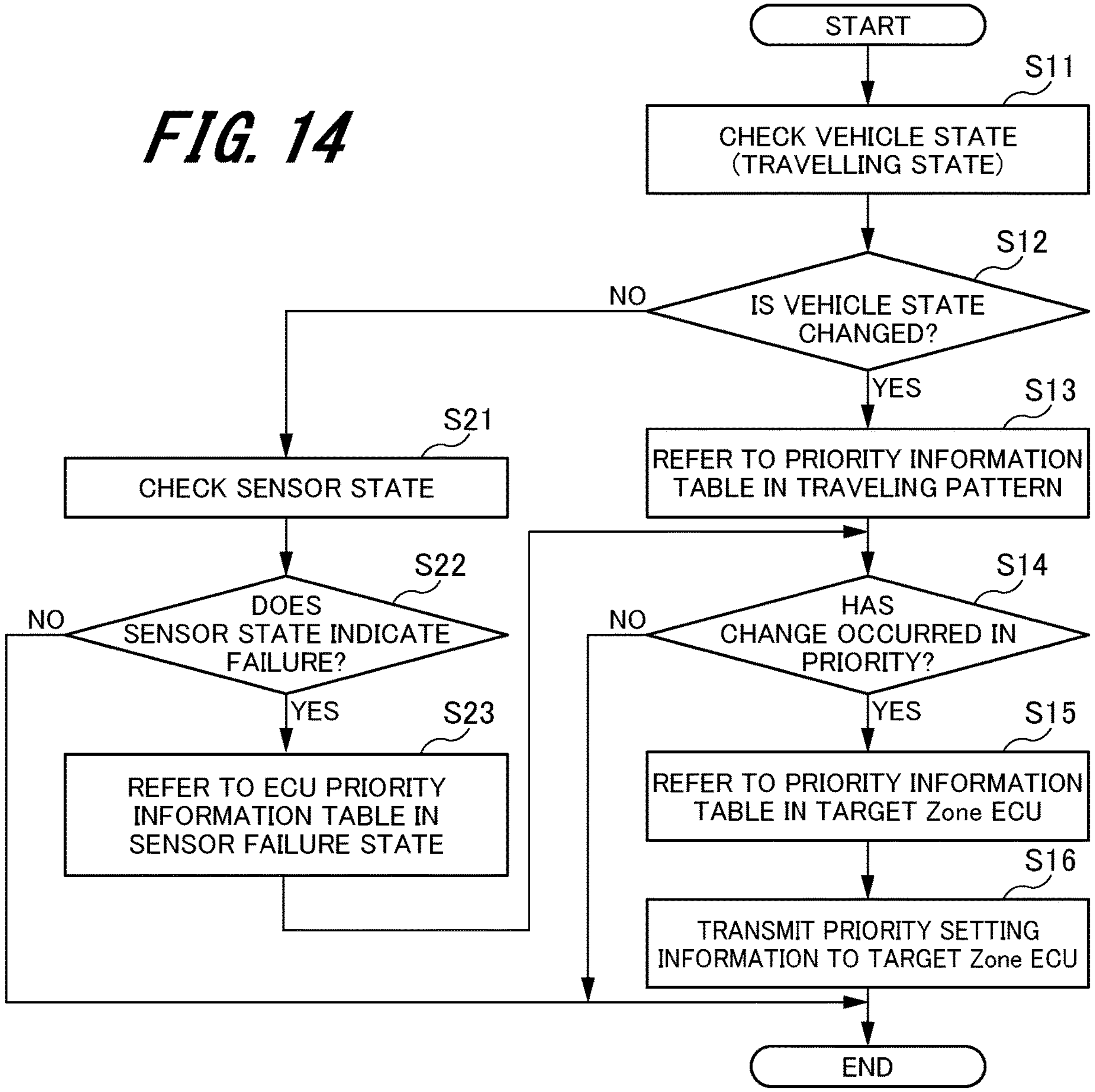
FIG. 14 is a flowchart illustrating an example of a process of an integrated ECU side according to the second embodiment of the present invention.

FIG. 14 is a flowchart illustrating an example of the process of the integrated ECU side according to the second embodiment. In FIG. 14, processes (S11 to S16) similar to the processes of the integrated ECU side according to the first embodiment illustrated in FIG. 9 are denoted by the same step numbers, and description of the processes is omitted.

In a case in which the vehicle state determination unit 71 determines that there is no change in the vehicle state in the process of step S12 (NO in S12), the sensor state determination unit 72 checks the sensor state of the sensor connected to each Zone ECU (S21). Then, the sensor state determination unit 72 determines whether or not a failure has occurred in the sensor (S22).

In a case in which the sensor state determination unit 72 determines that a failure has occurred in the sensor (YES in S22), the sensor state determination unit 72 acquires information of the Zone ECU to which other sensors capable of covering the recognition range of the faulty sensor are connected (for example, information of the Zone ECUs 1 and 4 in a case in which the sensor 2 has a failure) with reference to the ECU priority information table 24 in the sensor failure state (S23). Thereafter, the vehicle state determination unit 71 determines whether or not there is a change in the priority of the priority information table in each Zone ECU on the basis of the information of the Zone ECU (S14). The process after step S14 is similar to the process described above.

In a case in which the sensor state determination unit 72 determines in step S22 that no failure has occurred in the sensor (NO in S22), or in a case in which the vehicle state determination unit 71 determines in step S14 that there is no change in priority (NO in S14), the present process ends.

Here, a difference of the vehicle control system 1000B according to the second embodiment from the vehicle control system 1000A according to the first embodiment will be described.

In a case in which there is no change in the vehicle state, the sensor state determination unit 72 of the integrated ECU 20 checks the sensor state of the sensor connected to each Zone ECU. In a case in which a failure occurs in the sensor, the sensor state determination unit 72 acquires information of the Zone ECU to which the redundant sensor is connected with reference to the ECU priority information table 24 in the sensor failure state. Then, the vehicle state determination unit 71 changes the priority of the Zone ECU to high on the basis of the information of the Zone ECU acquired by the sensor state determination unit 72. As described above, the integrated ECU-side processing program 21 according to the second embodiment switches the priority of the Zone ECU in accordance with the sensor state, thereby appropriately switching the priority information when a failure has occurred in the sensor.

Note that the number of sensors having a failure is not limited to one, and the vehicle control system 1000B according to the second embodiment can cope with a case in which a plurality of sensors have a failure. Similarly, the integrated ECU 20 changes the priority of the Zone ECU connected to the non-faulty sensor to high as long as the recognition range of the faulty sensor can be covered by the recognition range of the non-faulty sensor.

Modification Example

The vehicle state includes the left turn, the right turn, and the like. Here, if the priority is changed depending on a stage such as an initial stage, an intermediate stage, and an end stage during the left turn, the traveling of the vehicle 600 is performed more safely and reliably. In this regard, a vehicle control system according to a modification example of the first and second embodiments of the present invention will be described with reference to FIGS. 15 and 16. In the vehicle control system according to the modification example, the operation of the vehicle 600 is divided, and a process of changing the priority of the Zone ECU is performed for each divided operation.

The vehicle state determination unit (vehicle state determination unit 71) gives an instruction to change the priority to the area electronic device (Zone ECUs 1 to 4) for each temporal change in the operation of the vehicle (vehicle 600) included in the change in the state of the vehicle (vehicle 600) with reference to the first priority information table (the priority information table 22 in the traveling pattern) and the second priority information table (the priority information table 23 in each Zone ECU) from a time when the change in the state of the vehicle (vehicle 600) starts to a time when the change ends. A specific example will be described below.

FIG. 15 is a table configuration diagram illustrating an example of the priority information table 22 in the traveling pattern according to a third embodiment.

Figure 16:
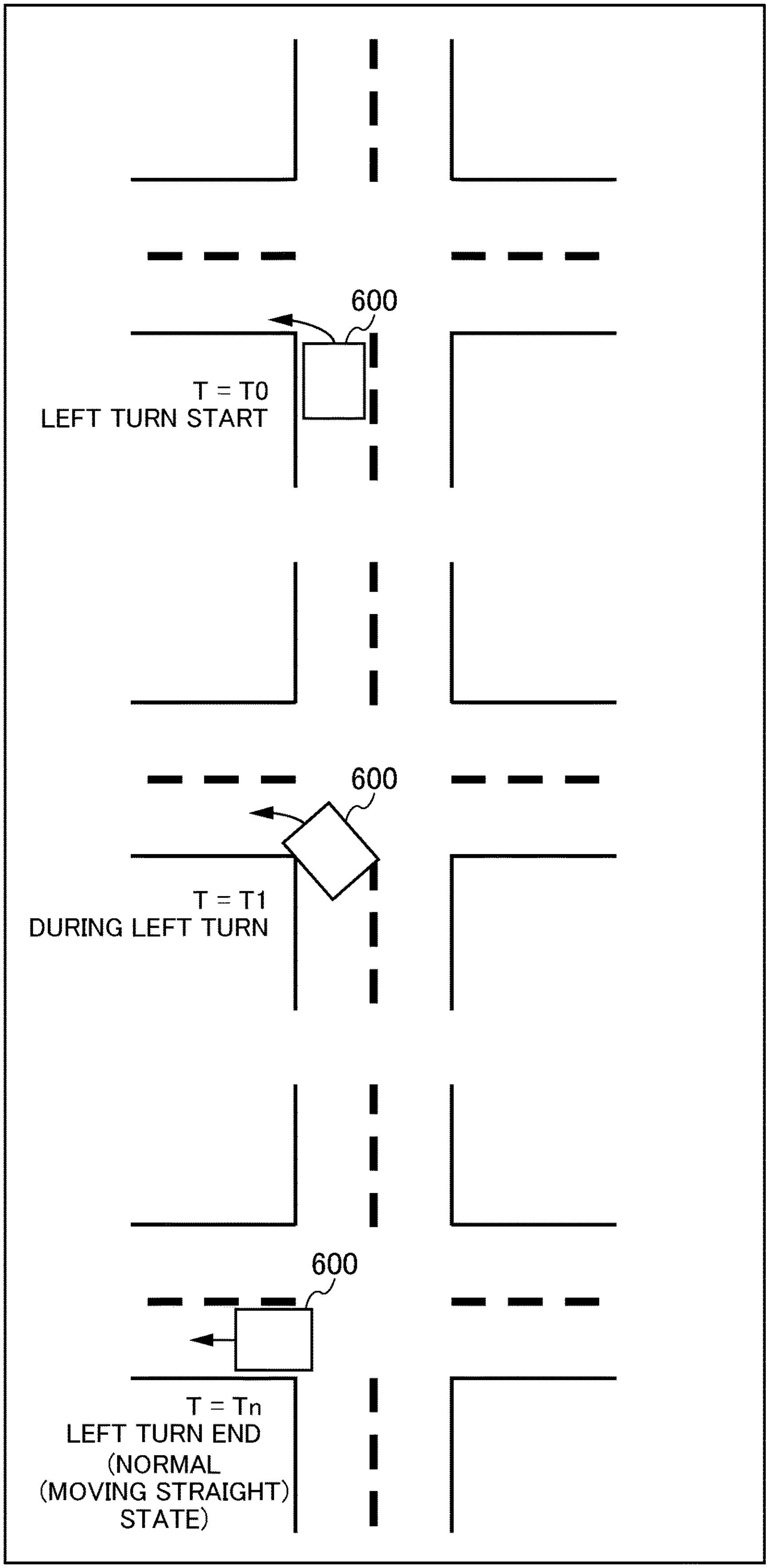
FIG. 16 is a top view illustrating an aspect in which a vehicle according to a modification example of the first and second embodiments of the present invention turns left at an intersection.

FIG. 16 is a top view illustrating an aspect in which the vehicle 600 turns left at an intersection.

Here, it is assumed that operation examples of three types of temporal changes of a left turn start, a left turn, and a left turn end in the left turn traveling of the vehicle 600 (operation of the vehicle) are specified as the traveling pattern.

(T=T1)

At the time of the left turn start, all the Zone ECUs 1 to 4 have the priority of "medium".

(T=T1)

During the left turn, the priority of the Zone ECU 1 to which the sensor 2 on the left front side of the vehicle 600 is connected and the priority of the Zone ECU 4 to which the sensor 3 on the left rear side is connected are changed to "high".

(T=Tn)

At the time of the left turn end, the state returns to the normal state, and the vehicle 600 moves straight in the left direction. For this reason, all the priorities of the Zone ECUs 1 to 4 are returned to "middle".

Further, in a case in which the integrated ECU 20 determines that the vehicle 600 passes through a place with a high risk on the basis of past data, the integrated ECU may perform control such that the priority of the Zone ECU to which a sensor capable of acquiring information around the place with a high risk when the vehicle 600 passes is connected is increased. Further, there is a place where the risk increases when traveling at a certain speed or higher at a certain time (for example, school zones in the morning). In this case, when the vehicle 600 passes through the place, the integrated ECU 20 may perform control such that the priority of the Zone ECU to which a sensor capable of acquiring information around the place is connected is increased.

In the vehicle control systems 1000A and 1000B according to the modification example described above, a plurality of types of operations according to the passage of time are specified as the traveling pattern of the vehicle 600. Further, the priority of the Zone ECU is specified for each operation in the priority information table 22 in the traveling pattern. Therefore, the integrated ECU 20 can change the priority of the Zone ECU in accordance with the operation of the vehicle 600 traveling in a certain traveling pattern, and acquire more detailed information.

Note that the present invention is not limited to the above-described embodiments, and it is obvious that various other application examples and modification examples can be made without departing from the gist of the present invention set forth in claims.

For example, the above-described embodiments are examples for describing the configurations of the device and the system specifically in detail in order to help understanding the present invention in an easy-to-understand manner, and are not necessarily limited to those having all the components described above. Further, some of the components of the embodiment described here may be replaced with the components of other embodiments, and furthermore, the components of other embodiments may be added to components of a certain embodiment. In addition, addition, deletion, replacement of other components may be performed on some of the components of each embodiment.

Also, the control lines or information lines illustrated indicate those considered necessary for description purposes, and may not necessarily represent all control lines or information lines in the product. In practice, almost all the components may be considered to be connected to each other.

REFERENCE SIGNS LIST

10A, 10B, 10C, 10D Zone ECU
11A, 11B, 11C, 11D Processing program
12A, 12B, 12C, 12D Priority information table
13A, 13B, 13C, 13D, 14A Sensor
15A, 15B, 15C, 15D Priority setting unit
20 Integrated ECU
21 Integrated ECU-side processing program
22 Priority information table in traveling pattern
23 Priority information table in each Zone ECU
50A, 50B, 50C, 50D Memory
60 Memory
70 CPU
600 Vehicle
1000A Vehicle control system

The invention claimed is:

1. An electronic control device that controls a vehicle on the basis of one or a plurality of pieces of information acquired from a plurality of area electronic devices disposed for each of areas obtained by segmenting the vehicle, the electronic control device comprising:

a first priority information table which is disposed for each of the plurality of area electronic devices and in which priorities for transmitting information for the area electronic devices that acquire information are set, wherein two of the area electronic devices in the first priority information table have different priorities; and a control unit configured to decide, in response to determining that a state of the vehicle is changed from an outside situation of the vehicle, an area electronic device whose priority is changed in accordance with the changing state of the vehicle with reference to the first priority information table, wherein the control unit is configured to give an instruction to change the priority to the decided area electronic device, and wherein the control unit is configured to obtain information indicating that the priority has been changed to high from the area electronic device to which the instruction to change the priority is given, wherein, during a turn, a first area electronic device of the plurality of area electronic devices disposed in a first area on a first side of the vehicle matching an inside of the turn corresponds to a higher priority than a second area electronic device of the plurality of area electronic devices disposed in a second area on a second side of the vehicle matching an outside of the turn.

2. The electronic control device according to claim 1, comprising a second priority information table that specifies a relationship between the state of the vehicle and the priority of the information transmitted from the area electronic device for each type of the information transmitted from the area electronic device, wherein the control unit includes a vehicle state determination unit that determines a change in the state of the vehicle on the basis of the outside situation, decides the area electronic device whose priority is changed in a case in which the priority specified in the second priority information table before the state of the vehicle changes is different from the priority specified in the second priority information table after the state of the vehicle changes, and gives an instruction to change the priority to the decided area electronic device.

3. The electronic control device according to claim 2, wherein the vehicle state determination unit determines the state of the vehicle from the outside situation on the basis of a state machine that specifies the state of the vehicle and a transition of the state of the vehicle.

4. The electronic control device according to claim 3, wherein the control unit includes a sensor state determination unit that determines a state of a sensor for recognizing the outside situation, which is connected to each of the plurality of area electronic devices, and the vehicle state determination unit increases the priority of the area electronic device to which another sensor capable of covering a recognition range of a sensor determined to have a failure by the sensor state determination unit is connected.

5. The electronic control device according to claim 3, wherein the vehicle state determination unit gives an instruction to change the priority to the area electronic device for each temporal change in an operation of the vehicle included in the change in the state of the vehicle with reference to the first priority information table and the second priority information table from a time when the change in the state of the vehicle starts to a time when the change ends.

6. The electronic control device according to claim 4, wherein each of the plurality of area electronic devices is disposed near an arrangement position of the sensor disposed in the vehicle.

7. The electronic control device according to claim 6, wherein the arrangement position of the sensor includes any one of a front right, a front left, a rear right, and a rear left of the vehicle.

8. A vehicle control system comprising: a plurality of area electronic devices disposed for each of areas obtained by segmenting a vehicle; and an electronic control device that controls the vehicle on the basis of one or a plurality of pieces of information acquired from the plurality of area electronic devices, the electronic control device including a first priority information table which is disposed for each of the plurality of area electronic devices and in which priorities for transmitting information for the area electronic devices that acquire the information are set, wherein two of the area electronic devices in the first priority information table have different priorities, and a control unit configured to decide, in response to determining that a state of the vehicle is changed from an outside situation of the vehicle, an area electronic device whose priority is changed in accordance with the changing state of the vehicle with reference to the first priority information table, wherein the control unit is configured to give an instruction to change the priority to the decided area electronic device, and wherein the control unit is configured to obtain information indicating that the priority has been changed to high from the area electronic device to which the instruction to change the priority is given, wherein, during a turn, a first area electronic device of the plurality of area electronic devices disposed in a first area on a first side of the vehicle matching an inside of the turn corresponds to a higher priority than a second area electronic device of the plurality of area electronic devices disposed in a second area on a second side of the vehicle matching an outside of the turn.

9. A method for an electronic control device to control a vehicle on the basis of one or a plurality of pieces of information acquired from a plurality of area electronic devices disposed for each of areas obtained by segmenting the vehicle, the method comprising:

providing a first priority information table disposed for each of the plurality of area electronic devices and in which priorities for transmitting information for the area electronic devices that acquire information are set, wherein two of the area electronic devices in the first priority information table have different priorities;

deciding, in response to determining that a state of the vehicle is changed from an outside situation of the vehicle, an area electronic device whose priority is changed in accordance with the changing state of the vehicle with reference to the first priority information table;

providing an instruction to change the priority to the decided area electronic device; and obtaining information indicating that the priority has been changed to high from the area electronic device to which the instruction to change the priority is given, wherein, during a turn, a first area electronic device of the plurality of area electronic devices disposed in a first area on a first side of the vehicle matching an inside of the turn corresponds to a higher priority than a second area electronic device of the plurality of area electronic devices disposed in a second area on a second side of the vehicle matching an outside of the turn.

10. The method of claim 9, wherein a second priority information table that specifies a relationship between the state of the vehicle and the priority of the information transmitted from the area electronic device for each type of the information transmitted from the area electronic device, the method further comprises determining a change in the state of the vehicle on the basis of the outside situation, decides the area electronic device whose priority is changed in a case in which the priority specified in the second priority information table before the state of the vehicle changes is different from the priority specified in the second priority information table after the state of the vehicle changes, and gives an instruction to change the priority to the decided area electronic device.

11. The method of claim 10, further comprising determining the state of the vehicle from the outside situation on the basis of a state machine that specifies the state of the vehicle and a transition of the state of the vehicle.

12. The method of claim 11, further comprising:

determining a state of a sensor for recognizing the outside situation, which is connected to each of the plurality of area electronic devices, and increasing the priority of the area electronic device to which another sensor capable of covering a recognition range of a sensor determined to have a failure is connected.

13. The method of claim 11, further comprising determining an instruction to change the priority to the area electronic device for each temporal change in an operation of the vehicle included in the change in the state of the vehicle with reference to the first priority information table and the second priority information table from a time when the change in the state of the vehicle starts to a time when the change ends.

14. The method of claim 12, wherein each of the plurality of area electronic devices is disposed near an arrangement position of the sensor disposed in the vehicle.

15. The method of claim 14, wherein the arrangement position of the sensor includes any one of a front right, a front left, a rear right, and a rear left of the vehicle.

* * * * *